United States Patent Office
3,042,720
Patented July 3, 1962

3,042,720
HYDROXY-ALKYL-AMINOACETYL XYLIDIDES
George Paabo, Toronto, Ontario, Canada, assignor to Fine Chemicals of Canada Limited, Toronto, Ontario, Canada, a corporation of Ontario
No Drawing. Filed May 18, 1959, Ser. No. 813,668
3 Claims. (Cl. 260—562)

My invention relates to improvements in pharmaceutical compounds of the type known as local anaesthetics, and more particularly to the class of local anaesthetics of which lidocaine, N-diethylaminoacetyl-2,6-xylidide, is typical. This group of chemical compounds has been described by Erdtmann and Lofgren in "Svensk Kemish Tidskrift," vol. 49 (1937), pp. 163–174, and U.S. Patent No. 2,441,498 of May 11, 1948, to Lofgren and Lundqvist claims lidocaine.

While the lidocaine type of compound represented a substantial advance in pharmacology, I have found that if one or more of the alkyl groups of at least some of these alkyl-aminoacetyl xylidides such as, for example, lidocaine, are replaced by a hydroxy-alkyl group i.e. an alcohol group, the resulting compounds have superior anaesthetic action and, more important, lower toxicity to the recipient, especially when administered by subcutaneous injection: in fact, some of my hydroxy-alkyl compounds may be useful in pharmacology while their previously known alkyl analogues are too toxic to be so used.

Thus, an object of my invention is to devise a series of new chemical compounds which have local anaesthetic properties.

A further object of my invention is to devise such compounds which have superior local anaesthetic properties to, and lower toxicity than, previously known compounds.

A still further object is to devise economical and efficient means of preparing such chemical compounds.

With the above, and other objects in view which will hereinafter appear as my specification proceeds, my invention consists of the chemical compounds, methods of preparing them, and methods of using them pharmacologically all as hereinafter more particularly described and illustrated.

The new compounds of my invention may be represented by the formula

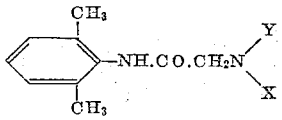

in which Y represents a hydroxy alkyl or a dihydroxy alkyl group and Z represents either hydrogen, an alkyl group, or an alkyl alcohol group, and the other symbols have the usual meaning. The compounds represented by this formula are, of course, known as hydroxy-alkyl-aminoacetyl xylidides, a specific example of which is N-N-bis(2-hydroxyethyl) - aminoacetyl-2,6-xylidide, believed to have the following formula:

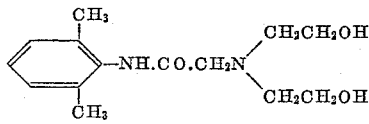

It will appear from the examples which follow that I have two preferred methods of preparing such a compound. The first is by reacting a hydroxy-alkyl amine with a toluenesulphonyl glycolyl xylidide, and the second is by reacting a hydroxy-alkyl amine with a halogenacetyl xylidide. I do not, of course, intend this disclosure to limit the methods by which my new compounds may be prepared.

There follows a detailed description of my new chemical compounds, together with details for the preparation of each by one or both of the two above methods.

*N - ethyl - N - (2 - hydroxyethyl) - aminoacetyl - 2,6-xylidide.*—The free base occurs as fine needles with a melting point of 102.8° to 103.6° C. assaying 10.9% nitrogen against a calculated 11.1%. The hydrochloride melts at 173° to 175° C., assaying nitrogen 9.6% and chlorine 12.5% against a calculated value for $C_{14}H_{22}N_2O_2HCl$ of 9.76% and 12.4% respectively. I have prepared this compound as follows:

Example 1

148 grams of O-paratoluenesulphonyl glycolyl-2,6-xylidide are dissolved in 400 millilitres of 100% ethanol by gentle heating, and 49 g. of N-ethyl-ethanol amine are added. The mixture is heated to reflux, and a solution of 17.8 g. of sodium hydroxide in 200 ml. of 95% ethanol added during 10 minutes. The mixture is refluxed for 2 hours, cooled, and the separated sodium salt of paratoluenesulphonic acid filtered off. The filtrate is concentrated under vacuum until the alcohol has been removed, the residue is dissolved in 500 ml. of benzol, washed 3 times with water, and extracted with 2 N hydrochloric acid. The acid layer is treated with charcoal, and filtered. Enough 33% sodium hydroxide solution is added to the acid extract to make it strongly alkaline (pH 12 to 13) and the precipitated base filtered off and dried. The N-(2-hydroxyethyl)-aminoacetyl-2,6-xylidide base may be purified by recrystallization from hexane. The base crystals are dissolved in 400 ml. of dry acetone and the hydrochloride precipitated by leading dry hydrogen chloride into the solution. The crystals are filtered off, washed with acetone, and the crude hydrochloride is dried under vacuum and recrystallized from absolute ethanol.

Example 2

To 120 g. of chloracetyl-2,6-xylidide, 750 ml. of benzene and 120 g. of N-ethyl-ethanolamine are added. The mixture is refluxed for 7 hours and allowed to stand overnight. The reaction mixture is washed with water and extracted with 15% hydrochloric acid. The acid solution is treated with decolourizing charcoal, filtered, and made strongly basic by the addition of 33% sodium hydroxide. The base is filtered off and dried. The base crystals are dissolved in 500 ml. of dry acetone, the hydrochloride precipitated by dry hydrogen chloride gas, on cooling, the hydrochloride is filtered off, washed with cold acetone, and the crude hydrochloride is recrystallized from absolute ethanol.

*N,N-bis(2-hydroxyethyl) - aminoacetyl-2,6-xylidide.*— The free base occurs as prismatic crystals, having a melting point of 116.5° to 118° C., and assayed 10.33% nitrogen (theoretical 10.51%). The hydrochloride melts at 160° to 162° C. and assayed 8.97% nitrogen and 11.6% chlorine against a calculated value for $C_{14}H_{22}N_2O_3HCl$ of 9.25% and 11.72% respectively. The hydrochloride is hydrated easily in a moist atmosphere, which results in depression of the melting point. Details of the preparation follow:

Example 3

109 g. of O-paratoluenesulphonyl glycolyl-2,6-xylidide are dissolved in 300 ml. of absolute alcohol, and 38 g. of diethanolamine added. The mixture is heated to reflux and a solution of 13.1 g. sodium hydroxide in 150 ml. 95% ethanol is added during 10 minutes. The mixture is refluxed for 2 hours and filtered. The alcohol is distilled off, and the residue taken up in 500 ml. of chloroform. The chloroform solution is washed with water, extracted with 2 N hydrochloric acid, and the acid extract treated with charcoal and filtered. The base is liberated by the addition of 33% sodium hydroxide solution, and is taken up in chloroform. The chloroform is distilled off and the residue dissolved in acetone, from which crystals of the free base may be separated. The hydrochloride may be precipitated from the alkaline chloroform solution with dry hydrogen chloride gas, and recrystalled from absolute ethanol.

Example 4

To 150 g. of chloracetyl-2,6-xylidide, 950 ml. of benzol and 145 g. of diethanolamine are added. The mixture is refluxed for 16 hours, cooled, and washed with water. The crude base is extracted from the benzene solution with 15% hydrochloric acid, followed by extraction with 5% hydrochloric acid. The acid extracts are combined and treated with charcoal and filtered. The filtrate is made strongly alkaline, and the separated crude base is dissolved in chloroform. The chloroform is distilled off and the residue is dissolved in 1 litre of dry acetone, from which the base may be separated by evaporation of the acetone, or the crude hydrochloride may be precipitated by dry hydrogen chloride gas, filtered off and washed with cold acetone.

*B - (2-methyl-1,3-dihydroxypropylamino)-2,6-dimethyl-acetanilide.*—The free base is a yellowish, very viscous, oil which can be distilled under vacuum. It has a boiling point at 0.9 mm. Hg of 215° to 218° C. This vacuum-distilled product solidifies slowly on standing, which solid has a melting point of 74.6° to 80.6° C. and assays 11.24% nitrogen against a calculated 11.2%. The hydrochloride has a melting point of 193.6° to 195.6° C. and assayed 9.7% nitrogen and 12.5% chlorine against a calculated value for $C_{14}H_{22}N_2O_2HCl$ of 9.76% and 12.4% respectively. I have prepared this compound as follows:

Example 5

218 g. of O-paratoluenesulphonyl glycolyl-2,6-xylidide are dissolved in 600 ml. of absolute alcohol, 72 g. of 2-amino-2-methyl-1-propanol are added and the mixture heated to reflux. A solution of 26.2 g. of sodium hydroxide in 300 ml. of 95% ethanol is added during 10 minutes, and the mixture refluxed for 2 hours. The alcohol is distilled off and the residue dissolved in 600 ml. of benzol. The benzol solution is washed with water and extracted with 2 N hydrochloric acid. The acid extract is treated with charcoal and filtered. The filtrate is made strongly alkaline with 33% sodium hydroxide solution, and the base extracted with benzol. The benzol is distilled off and the residue is dissolved in acetone, from which the free base may be separated, or the crude hydrochloride may be precipitated by treating with dry hydrogen chloride gas.

Example 6

To 243 g. of chloracetyl-2,6-xylidide 1.56 litres of benzol and 243 g. of 2-amino-2-methyl-1-propanol are added. The mixture is refluxed for 7 hours and left standing overnight. The reaction mixture is washed 3 times with 500 ml. of water each time and extracted with 220 ml. of 15% hydrochloric acid, 100 ml. of 5% hydrochloric acid, and finally with 200 ml. of water. The combined extracts are treated with charcoal and filtered. The filtrate is made strongly alkaline (pH 12.5–13) with 33% sodium hydroxide solution, and the separated base is dissolved in 600 ml. of benzol. The solvent is distilled off and the residue dissolved in 900 ml. of dry acetone, from which the free base may be separated, or the acetone solution may be treated with dry hydrogen chloride gas and the precipitated salt filtered off and washed with cold acetone.

*N - (2-methyl-1,3-dihydroxypropyl)-2-aminoacetyl-2,6-xylidide.*—The free base is a white, crystalline substance, melting point 99.4° to 101.8° C., assaying 10.44% nitrogen against a calculated value of 10.51%. The hydrochloride has a melting point of 160.8° to 164.2° C. and it assays nitrogen 9.15%, chlorine 11.6%. Calculated for $C_{14}H_{22}N_2O_3HCl$: 9.25% and 11.72%, respectively.

Example 7

To 150 g. of chloracetyl-2,6-xylidide in 1500 ml. of benzol 165 g. of 2-amino-2-methyl-1,3-propanediol are added. The mixture is refluxed for 16 hours and the benzol removed by vacuum distillation. To the residue 800 ml. of chloroform is added, followed by 300 ml. of water, and the mixture is heated gently with stirring until the residue has dissolved. The water layer is removed and the chloroform layer washed once more with 200 ml. of water. To the chloroform layer 15 g. of charcoal and 100 g. of anhydrous sodium sulfate are added. After standing for 6 hours the chloroform solution is filtered and precipitated with dry hydrogen chloride gas. The crude hydrochloride is recrystallized from 5 parts of isopropyl alcohol and dried in a vacuum oven.

The free base may be obtained from the chloroform solution by removing the chloroform and crystallizing the residue from two parts of acetone.

I have compared the physiological action of three of my new compounds with the following quantitative results.

Amount required to produce acute toxicity in mice by intraperitoneal injection of a 2% solution of the hydrochloride, in milligrams per kilogram of test animal weight: my methyl-hydroxypropyl compound, 240; my ethyl-hydroxyethyl compound, 250; and my bis hydroxyethyl compound, 1400.

Tissue toxicity was evaluated by intradermal injection into guinea pigs: my methyl-hydroxypropyl compound produced no necrosis at solution strengths below 5%; my ethyl-hydroxyethyl compound the same; and my bis hydroxyethyl compound none below 3%.

Local anaesthetic potency was evaluated by intradermal injections into guinea pigs, which produced true anaesthesia, with 2% solutions, lasting for my methyl-hydroxypropyl compound, 45 to 75 minutes; for my ethyl-hydroxyethyl compound, 105 to 150 minutes; and for my bis hydroxyethyl compound from 45 to 60 minutes.

Speed of action was evaluated by injecting into mice, a ½% solution of ethylenediaminetetra-acetic acid tetra-sodium salt (Versene) which carried ½% of each of my different compounds. The Versene solution alone produces a very painful reaction. No reaction suggesting pain was observed in any of the test animals when any of my compounds were injected with the Versene.

From the foregoing, it appears that my new hydroxy-alkyl-aminoacetyl xylidides are effective local anaesthetics, some of which have lower toxicity than the lidocaine type of local anaesthetic, and all of which have certain advantages thereover.

While I have identified and described four new chemical compounds, and methods of preparing each of them, this disclosure is intended for purposes of illustration only, and to impose no limitations on the scope of my invention beyond those set forth in the appended claims.

What I claim as my invention is:

1. N,N-bis(2-hydroxyethyl)-aminoacetyl-2,6-xylidide.
2. B - (2 - methyl - 1,3 - dihydroxypropylamino)-2,6-dimethyl-acetanilide.
3. The method of preparing a hydroxy-alkyl-aminoacetyl xylidide which comprises reacting toluenesulphonyl glycolyl xylidide with a hydroxy-alkyl-amine, and separating the hydroxy-alkyl-aminoacetyl xylidide from the reaction mixture.

References Cited in the file of this patent

Lofgren et al. Svensk Kem Tidskr, vol. 58 (1946), pages 323–335 (pages 326 and 331 relied upon).

Buchi et al.: "Hebetica Chimica Acta," vol. 34 pages 278–290 (1951).

Hofstetter: "Nature," vol. 170, page 980 (1952).

UNITED STATES PATENT OFFICE
CERTIFICATE OF CORRECTION

Patent No. 3,042,720 July 3, 1962

George Paabo

It is hereby certified that error appears in the above numbered patent requiring correction and that the said Letters Patent should read as corrected below.

Column 1, line 13, for "Kemish" read -- Kemisk --; line 51, for "Z" read -- X --; column 4, line 72, for '"Hebetica Chimica Acta,"' read -- "Helvetica Chimica Acta," --.

Signed and sealed this 11th day of February 1964.

(SEAL)
Attest:

ERNEST W. SWIDER
Attesting Officer

EDWIN L. REYNOLDS
Acting Commissioner of Patents

Notice of Adverse Decision in Interference

In Interference No. 94,431 involving Patent No. 3,042,720, G. Paabo, HYDROXY-ALKYL-AMINOACETYL XYLIDIDES, final judgment adverse to the patentee was rendered June 28, 1966, as to claim 2.

[*Official Gazette August 9, 1966.*]